United States Patent
Ruan et al.

(10) Patent No.: US 10,078,250 B2
(45) Date of Patent: Sep. 18, 2018

(54) DRIVING METHOD FOR PIXEL

(71) Applicant: AU Optronics Corporation, Hsin-Chu (TW)

(72) Inventors: Hung-Shiang Ruan, Hsin-Chu (TW); Chien-Wen Chen, Hsin-Chu (TW); Chen-Hsien Liao, Hsin-Chu (TW); Jenn-Jia Su, Hsin-Chu (TW)

( * ) Notice: Subject to any disclaimer, the term of this patent is extended or adjusted under 35 U.S.C. 154(b) by 0 days.

(21) Appl. No.: 15/637,084

(22) Filed: Jun. 29, 2017

(65) Prior Publication Data

US 2018/0052353 A1    Feb. 22, 2018

(30) Foreign Application Priority Data

Aug. 18, 2016    (TW) .............................. 105126444 A (51) Int. Cl.
*G02F 1/1345* (2006.01)
*G09G 3/34* (2006.01)
*G09G 3/36* (2006.01)

(52) U.S. Cl.
CPC ....... *G02F 1/13454* (2013.01); *G09G 3/3406* (2013.01); *G09G 3/3607* (2013.01); *G09G 3/3648* (2013.01); *G09G 2320/0242* (2013.01)

(58) Field of Classification Search
CPC .............. G02F 1/13454; G09G 3/3404; G09G 3/3607; G09G 3/3648; G09G 3/3233; G09G 3/3258; G09G 3/3659; G09G 3/2011; G09G 3/2007; G09G 5/02
USPC .......................................................... 345/89
See application file for complete search history.

(56) References Cited

U.S. PATENT DOCUMENTS

| | | | | |
|---|---|---|---|---|
| 9,852,676 B2* | 12/2017 | Miyata | ................. | G09G 3/2018 |
| 2004/0001165 A1* | 1/2004 | Shiota | ..................... | G06T 5/009 348/678 |
| 2006/0132406 A1* | 6/2006 | Pan | ...................... | G09G 3/2011 345/89 |
| 2010/0157112 A1* | 6/2010 | Miyagi | .................. | H04N 5/202 348/242 |
| 2011/0052049 A1* | 3/2011 | Rajaraman | .......... | G06Q 10/087 382/165 |
| 2012/0105499 A1* | 5/2012 | Nakamura | .......... | G09G 3/3233 345/690 |
| 2014/0009512 A1* | 1/2014 | Lee | ......................... | G09G 5/02 345/690 |
| 2016/0110845 A1 | 4/2016 | Wu | | |
| 2016/0148576 A1* | 5/2016 | Kato | ..................... | G09G 3/2007 345/211 |
| 2016/0155404 A1* | 6/2016 | Kim | ..................... | G09G 3/3659 345/205 |

(Continued)

*Primary Examiner* — Fred Tzeng (57) ABSTRACT

A driving method for pixel is configured to drive a first pixel and a second pixel. The driving method includes that a first output gray value of the first pixel and a second output gray value of the second pixel are set according to saturation. The saturation is decided according to an input gray value. The first pixel and second pixel are driven according to the first output gray value and the second output gray value. When the saturation is within a first value range or a third value range, the difference between the first output gray value and the second output gray value is less than the difference between the first output gray value and the second output gray value, when the saturation is within a second value range. The second value range is between the first value range and the third value range.

10 Claims, 7 Drawing Sheets

---

Set a first output gray value of a first pixel and a second output gray value of a second pixel according to saturation — S11

Respectively drive the first pixel and the second pixel according to the first output gray value and the second output gray value — S13

(56) References Cited

U.S. PATENT DOCUMENTS

2017/0116934 A1 4/2017 Tien et al.
2017/0193909 A1* 7/2017 Song .................... G09G 3/3258

* cited by examiner

DRIVING METHOD FOR PIXEL

BACKGROUND

Technical Field

The present disclosure relates to a driving method for pixel, and more particularly to a driving method for pixel that drives a pixel according to saturation of an input gray value.

Related Art

High contrast and wide view are development trends of current large-screen televisions. A viewing angle of a normal television is limited. When the television is viewed from a visual angle exceeding a particular visual angle, color distortion and a luminance level difference may be generated on vision of a viewer. Currently, many television manufacturers are purpose built to develop wide view technology of liquid crystal display (LCD) televisions, which divides liquid crystal molecules in a same pixel region into a plurality of different alignment domains, that is, multi-domain, so as to achieve a wide view display effect.

However, restricted by optical properties of liquid crystals, this type of wide view LCD panels is subjected to color washout phenomena when being viewed from different visual angles. To solve the problem of the color washout phenomenon, in a wide view LCD panel, each pixel is further defined as a plurality of sub-pixels, and a space domain compensation technology is used to differentiate Gamma curve output features of the sub-pixels. Although the problem of the color washout phenomenon is effectively alleviated, color levels and luminance levels of the sub-pixels are different, causing color difference between pixels driven by a same gray value, resulting in a visual mesh of a uniform color-block image (or namely color image) displayed on the LCD panel.

SUMMARY

The present disclosure intends to provide a driving method for pixel, so as to solve a visual mesh of a color-block image (or namely a color image).

The driving method for pixel disclosed in the present disclosure is configured to drive a first pixel and a second pixel. The driving method for pixel includes: setting a first output gray value of the first pixel and a second output gray value of the second pixel according to saturation, where the saturation is decided according to an input gray value; and respectively driving the first pixel and second pixel according to the first output gray value and the second output gray value, where when the saturation is within a first value range or a third value range, the difference between the first output gray value and the second output gray value is less than the difference between the first output gray value and the second output gray value, when the saturation is within a second value range, and the second value range is between the first value range and the third value range.

The driving method for pixel disclosed in the present disclosure is configured to drive a first pixel, a second pixel, a third pixel, and a fourth pixel. The driving method for pixel includes: setting a first output gray value of the first pixel and a second output gray value of the second pixel according to first saturation, where the first saturation is decided according to a first input gray value; setting a third output gray value of the third pixel and a fourth output gray value of the fourth pixel according to second saturation, where the second saturation is decided according to a second input gray value; respectively driving the first pixel and second pixel according to the first output gray value and the second output gray value; and driving the third pixel and the fourth pixel according to the third output gray value and the fourth gray value, where when the first saturation is within one of a first value range and a third value range, and the second saturation is within a second value range, the difference between the first output gray value and the second output gray value is less than the difference between the third output gray value and the fourth output gray value, and the second value range is between the first value range and the third value range.

With the driving method for pixel disclosed in the present disclosure, the difference between pixels for displaying a color-block image is decided according to saturation of an input gray value, so that an image displayed on a screen still has an advantage of reducing wide-view color washout, and a visual mesh problem of a uniform color-block image is further reduced.

The foregoing description of the content of the present disclosure and the following description of implementation manners are intended to demonstrate and explain the spirit and principle of the present disclosure and to provide further explanations of the claims of the present disclosure.

DETAILED DESCRIPTION

Specific features and advantages of the present disclosure are described in detail in the implementation manners below, and content of the specific features and advantages is sufficient for a person skilled in the art to understand the technical content of the present disclosure and to carry out implementation on the basis thereof. Moreover, according to the disclosure of the description, the claims, and the drawings, a person skilled in the art can easily understand related objectives and advantages of the present disclosure. The embodiments below are intended to further describe the perspectives of the present disclosure in detail, but are not intended to use any perspective to limit the scope of the present disclosure.

Figure 1:
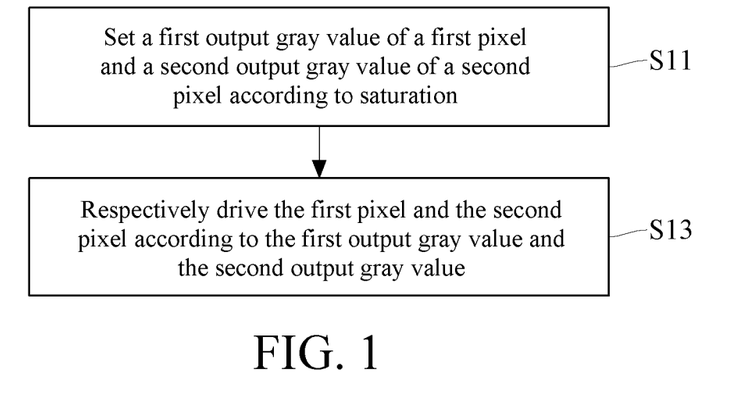
FIG. 1 is a step flowchart of a driving method for pixel according to an embodiment of the present disclosure.

Referring to FIG. 1, FIG. 1 is a step flowchart of a driving method for pixel according to an embodiment of the present disclosure. As shown in FIG. 1, in step s11 of the driving method for pixel, set a first output gray value of a first pixel and a second output gray value of a second pixel according to saturation. In step s13, respectively drive the first pixel and the second pixel according to the first output gray value and the second output gray value. In this embodiment, for example, the first pixel and the second pixel are two pixels for displaying a same color-block image (or namely a same color image), and the saturation is decided according to an input gray value of the color-block image (or namely color image). When a display receives the input gray value of color block data (or namely color data), the display converts the input gray value into a first output gray value and a second output gray value, drives a pixel structure corresponding to the first pixel according to the first output gray value, so as to enable the first pixel to produce a corresponding color, and drives a pixel structure corresponding to the second pixel according to the second output gray value, so as to enable the second pixel to produce a corresponding color.

In this embodiment, when the saturation of the input gray value is within a first value range (e.g. a low saturation range) or a third value range (e.g. a high saturation range), the difference between the first output gray value and the second output gray value is less than the difference between the first output gray value and the second output gray value, when the saturation is within a second value range, and the second value range is between the first value range and the third value range. In other words, when the saturation of the input gray value is within the low saturation range or the high saturation range, the color difference between colors displayed by the first pixel and the second pixel is relatively small. When the saturation of the input gray value is within a middle saturation range, the color difference between colors displayed by the first pixel and the second pixel is relatively large.

In an embodiment, a first pixel has a first color pixel, a second color pixel, and a third color pixel, and a second pixel has a first color pixel, a second color pixel, and a third color pixel. For example, the first color pixel, the second color pixel, and the third color pixel are a red sub-pixel, a green sub-pixel, and a blue sub-pixel, or sub-pixels of other colors. For example, color pixels are sub-pixels that produce different luminance levels of a same pure color. Colors produced by the first color pixel, the second color pixel, and the third color pixel of the first pixel are mixed to form a color displayed by the first pixel. Colors produced by the first color pixel, the second color pixel, and the third color pixel of the second pixel are mixed to form a color displayed by the second pixel. Each of the first pixel and the second pixel may have more color pixels, which is not limited in this embodiment. To facilitate the description, an R (red) sub-pixel, a G (green) sub-pixel, and a B (blue) sub-pixel are used to replace the first color pixel, the second color pixel, and the third color pixel for description below, which is not intended to limit this embodiment.

Figure 2:
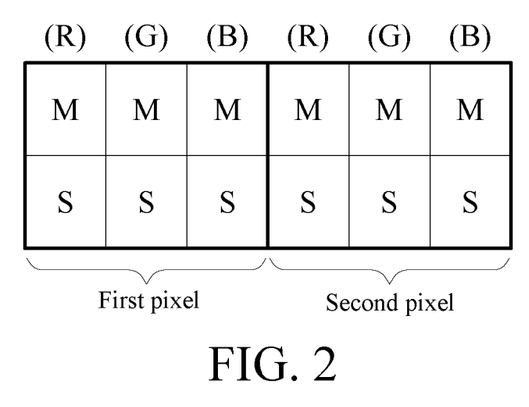
FIG. 2 is a schematic diagram of a first pixel and a second pixel according to a generally display.

The input gray value of the color-block image (or namely color image) also has an R (red) input gray value, a G (green) input gray value, and a B (blue) input gray value. Referring to FIG. 2, FIG. 2 is a schematic diagram of a first pixel and a second pixel according to a generally display. As shown in FIG. 2, in the generally display for solving a color washout problem caused by wide view, when a first pixel and a second pixel are used to display a same color-block image(or namely a same color image), each of respective R sub-pixels in the first pixel and the second pixel is cut (or called divided) into a main pixel (M) and a sub pixel (S), each of respective G sub-pixels in the first pixel and the second pixel is cut (or called divided) into a main pixel (M) and a sub pixel (S), and each of respective B sub-pixels in the first pixel and the second pixel is cut (or called divided) into a main pixel (M) and a sub pixel (S). The display uses an R input gray value to calculate main output gray values for driving the main pixels (M) and calculate sub output gray values for driving the sub pixels (S), drives the main pixels (M) of the R sub-pixels of the first pixel and the second pixel according to the main output gray values, drives the sub-pixels (S) of the R sub-pixels of the first pixel and the second pixel according to the sub output gray values, and likewise, drives the main pixels (M) and sub pixels (S) of the G sub-pixels by using a G input gray value and drives the main pixels (M) and the sub pixels (S) of the B sub-pixels by using a B input gray value.

In this way, in the generally display, each of the main pixels (M) and sub-pixels (S) has a respective driving circuit, causing that connection lines for connecting the driving circuits to a pixel array are doubled, and lines and calculations are more complex.

Figure 3:
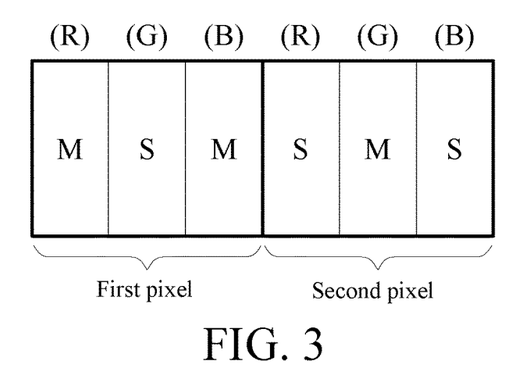
FIG. 3 is a schematic diagram of a first pixel and a second pixel according to an embodiment of the present disclosure.

Therefore, in this embodiment, reference is made to FIG. 3, and FIG. 3 is a schematic diagram of a first pixel and a second pixel according to an embodiment of the present disclosure. As shown in FIG. 3, when the first pixel and the second pixel are used to display a same color-block image (or namely a same color image), that is, the color-block images (or namely the color image) received by the first pixel and the second pixel substantially have a same gray value. R sub-pixels, G sub-pixels, and B sub-pixels in the first pixel and the second pixel are not cut (or called divided) into main pixels (M) and sub pixels (S), and respectively function, in an MSM form (e.g. main, sub, main pixels are arranged in a predetermined direction) and an SMS form (e.g. sub, main, sub pixels are arranged in a predetermined direction), to drive the first pixel and the second pixel.

In other words, when the first pixel and the second pixel are used to display a same color-block image (or namely a same color image), a display that uses the method of this embodiment calculates saturation of the color-block image according to an input gray value of the color-block image (or the color image), separately sets R output gray values, G output gray values, and B output gray values of the first pixel and the second pixel according to the saturation of the color-block image, respectively drives the R sub-pixel, the G sub-pixel, and the B sub-pixel of the first pixel by using the R output gray value, the G output gray value, and the B output gray value of the first pixel, and respectively drives the R sub-pixel, the G sub-pixel, and the B sub-pixel of the second pixel by using the R output gray value, the G output gray value, and the B output gray value of the second pixel.

When the color-block images (or the color images) received by the first pixel and the second pixel substantially have the same gray value, using the first pixel being driven by the MSM form and the second pixel being driven by the SMS form as an example, the R sub-pixel of the first pixel is in an M form (or namely main pixel), and the R sub-pixel of the second pixel is of an S form (or namely sub pixel). At this time, the R output gray value of the first pixel is greater than the R output gray value of the second pixel. Likewise, the G sub-pixel of the first pixel is of an S form (or namely sub pixel), the G sub-pixel of the second pixel is of an M form (or namely main pixel), and the G output gray value of the first pixel is less than the G output gray value of the second pixel. The B sub-pixel of the first pixel is of an M form (or namely main pixel), the B sub-pixel of the second pixel is of an S form (or namely sub pixel), and the B output gray value of the first pixel is greater than the B output gray value of the second pixel. In an embodiment, a first output gray value of a first pixel may be substantially equal to a second output gray value of a second pixel.

When saturation of an input gray value is within a first value range (e.g. a low saturation range) or a third value range (e.g. a high saturation range), the difference between a first output gray value and a second output gray value is relatively small. When the saturation of the input gray value is within a second value range, the difference between the first output gray value and the second output gray value is relatively large. The difference between the first output gray value and the second output gray value is associated with at least one of the difference between R output gray values of the first pixel and the second pixel, the difference between G output gray values of the first pixel and the second pixel, and the difference between B output gray values of the first pixel and the second pixel.

In an embodiment, when saturation of an input gray value is within a first value range or a third value range, the difference between R output gray values of a first pixel and a second pixel, the difference between G output gray values of the first pixel and the second pixel, and the difference between B output gray values of the first pixel and the second pixel are all relatively small. When the saturation of the input gray value is within a second value range, the difference between the R output gray values of the first pixel and the second pixel, the difference between the G output gray values of the first pixel and the second pixel, and the difference between the B output gray values of the first pixel and the second pixel are all relatively large, that is, the color difference between the first pixel and the second pixel is relatively large.

When the pixels for displaying substantially the same color-block image (or namely the same color image) are respectively driven in the MSM form and the SMS form, the wide-view color washout phenomenon of the color-block image (or namely the color image) can be alleviated, but the mesh phenomenon of the color-block image (or namely the color image) is relatively obvious. The human eye is not sensitive to visual color washout of colors with high saturation and low saturation, and therefore, in this embodiment, the display difference between the pixel driven by the MSM form and the pixel driven by the SMS form is reduced according to the saturation of the color when the saturation is high or the saturation is low, such that not only the wide-view color washout phenomenon of a display frame is reduced, but also the mesh problem of the color-block image (or namely the color image) is alleviated.

Figure 4:
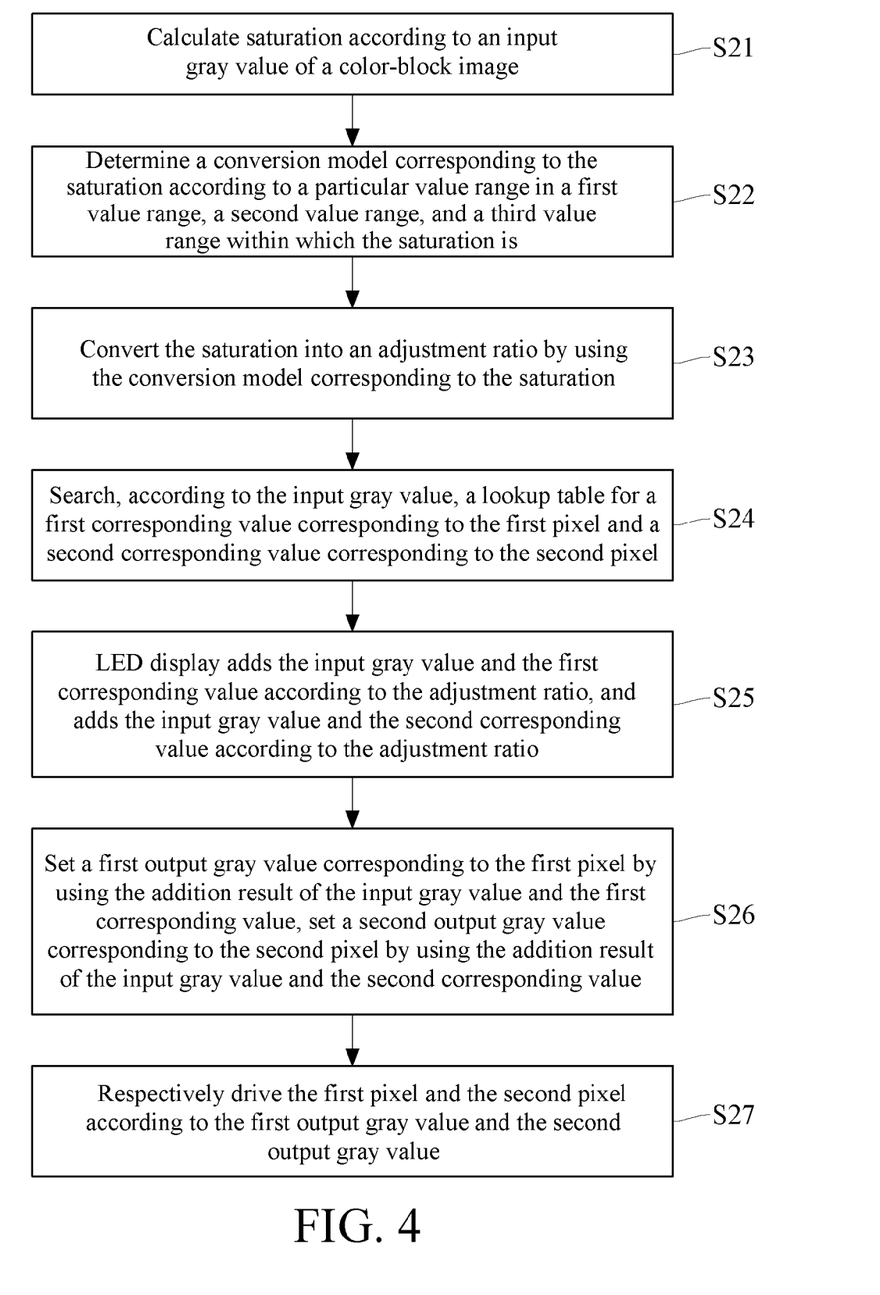
FIG. 4 is a step flowchart of a driving method for pixel according to another embodiment of the present disclosure.
Figure 5:
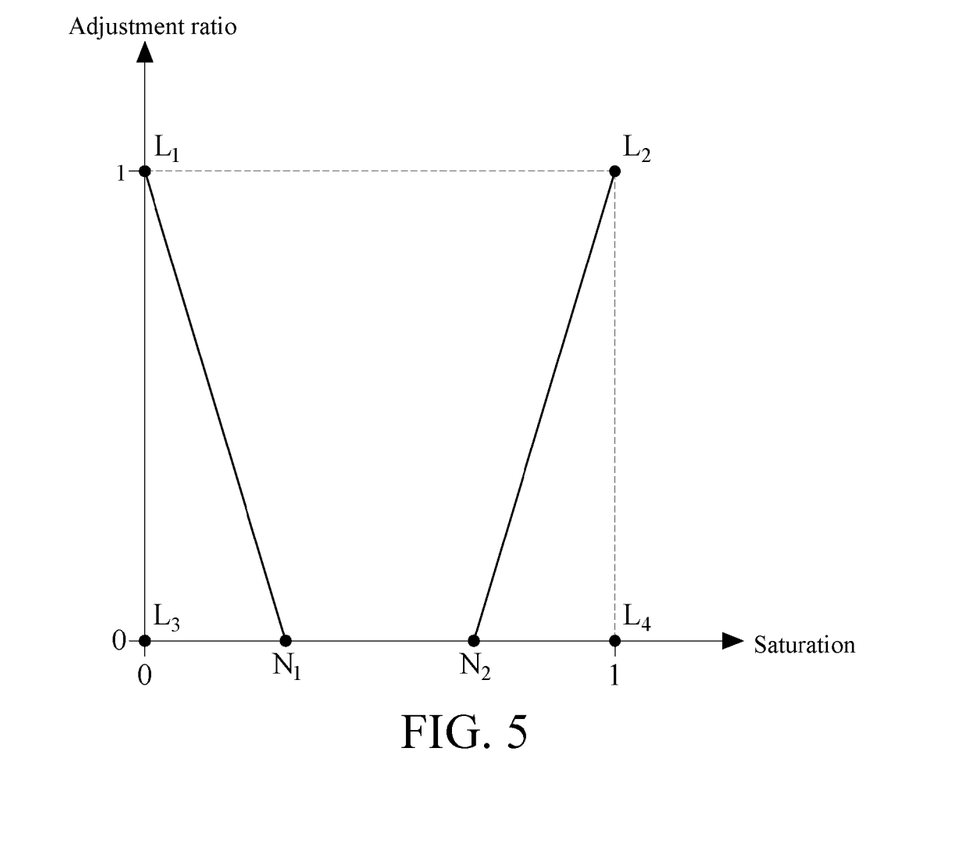
FIG. 5 is a schematic diagram of a conversion model according to another embodiment of the present disclosure.

Further, referring to FIG. 4 and FIG. 5, FIG. 4 is a step flowchart of a driving method for pixel according to another embodiment of the present disclosure, and FIG. 5 is a schematic diagram of a conversion model according to another embodiment of the present disclosure. As shown in FIG. 4, the driving method for pixel of this embodiment is adapted to a display. When a first pixel and a second pixel of the display are used to display a same color-block image (or namely the same color image), the display calculates, according to an input gray value of the color-block image, a first output gray value for driving the first pixel and a second output gray value for driving the second pixel.

Using each of the first pixel and the second pixel having an R sub-pixel, a G sub-pixel, and a B sub-pixel as an example, in step s21, the display calculates saturation according to the input gray value of the color-block image (or namely the color image). For example, the input gray value of the color-block image (or namely the color image) is (255, 220, 210), where 255 is an R input gray value, 220 is a G input gray value, and 210 is a B input gray value. The display calculates, according to the following calculation formula, that the saturation S of the input gray value is about 0.18, where $R_{in}$, $G_{in}$, and $B_{in}$ are the R input gray value, the G input gray value, and the B input gray value respectively.

$$S = \frac{\text{Max}(R_{in}, G_{in}, B_{in}) - \text{min}(R_{in}, G_{in}, B_{in})}{\text{Max}(R_{in}, G_{in}, B_{in})}$$

In step s22, the display determines a conversion model corresponding to the saturation according to a particular value range in a first value range, a second value range, and a third value range within which the saturation is. For example, the conversion model is a conversion diagram of FIG. 5. When the saturation is within the first value range 0 to $N_1$, a first conversion model corresponding to the saturation is defined as a decreasing curve that an adjustment ratio decreases with increase of the saturation. When the saturation is within the second value range $N_1$ to $N_2$, a second conversion model corresponding to the saturation is about 0. When the saturation is within the third value range $N_2$ to 1, a third conversion model corresponding to the saturation is defined as an increasing curve that the adjustment ratio increases with increase of the saturation.

For example, the conversion model is the following calculation formula, where $L_1$ to $L_4$ are separately parameter values, which may correspond to parameter values of the conversion diagram of FIG. 5. In step s23, the display converts the saturation S into an adjustment ratio Ratio by using the conversion model corresponding to the saturation S. For example, $L_1$ and $L_2$ are separately about 1, $L_3$ and $L_4$ are separately about 0, $N_1$ is about 0.3, $N_2$ is about 0.7, the saturation of the input gray value (255, 220, 210) is about 0.18, which is within the first value range 0 to $N_1$, and the saturation about 0.18 is converted into the adjustment ratio of about 0.41 according to the following conversion model.

$$\text{Ratio} = \frac{S \times (L_3 - L_1)}{N_1} + L_1, 0 \leq S \leq N_1$$

$$\text{Ratio} = \frac{(S - N_1) \times (L_4 - L_3)}{N_2 - N_1} + L_3, N_1 \leq S \leq N_2$$

$$\text{Ratio} = \frac{(S - N_2) \times (L_2 - L_4)}{1 - N_2} + L_4, N_2 \leq S \leq 1$$

In step s24, the display searches, according to the input gray value, a lookup table for a first corresponding value corresponding to the first pixel and a second corresponding value corresponding to the second pixel. The lookup table shows an MSM form (e.g. main, sub, main pixels are arranged in a predetermined direction) corresponding value and an SMS form (e.g. sub, main, sub pixels are arranged in a predetermined direction) corresponding value that correspond to each input gray value. For example, an MSM form corresponding value corresponding to the input gray value (255, 220, 210) is (255, 194, 238), and an SMS form corresponding value corresponding to the input gray value (255, 220, 210) is (255,244,176). In another embodiment, a lookup table shows a relationship between an M form (e.g. main pixel) corresponding value and an S form (e.g. sub pixel) corresponding value that correspond to each R input gray value, a relationship between an M form (e.g. main pixel) corresponding value and an S form (e.g. sub pixel) corresponding value that correspond to each G input gray value, and a relationship between an M form (e.g. main pixel) corresponding value and an S form (e.g. sub pixel) corresponding value that correspond to each B input gray value. For example, an R input gray value is 255, and corresponding M form and S form corresponding values are 255; a G input gray value is 220, and a corresponding M form corresponding value is 244 and a corresponding S form corresponding value is 194; and a B input gray value is 210, and a corresponding M form corresponding value is 238 and a corresponding S form corresponding value is 176. The lookup table is provided to the display, so that the display searches, according to the input gray value, for the first corresponding value corresponding to the first pixel and the second corresponding value corresponding to the second pixel.

In step s25, the display adds the input gray value and the first corresponding value according to the adjustment ratio, and adds the input gray value and the second corresponding value according to the adjustment ratio. In an embodiment, an adjustment ratio is a ratio of the difference between a first output gray value and a first corresponding value to the difference between an input gray value and the first corresponding value. For example, in the following calculation formula, the input gray value ($R_{in}$, $G_{in}$, $B_{in}$) and the first corresponding value LUT1 ($R_{in}$, $G_{in}$, $B_{in}$) are added according to the adjustment ratio, that is, (0.41×(255, 220, 210))+(0.59×(255, 194, 238))=(255, 205, 226), and an addition result is the first output gray value Output1 (R, G, B); and the input gray value ($R_{in}$, $G_{in}$, $B_{in}$) and a second corresponding value LUT2 ($R_{in}$, $G_{in}$, $B_{in}$) are added, that is, (0.41×(255, 220, 210)+(0.59×(255, 244, 176))=(255, 234, 190), and an addition result is a second output gray value Output2 (R, G, B).

$$Output(R,G,B)=Ratio \times (R_{in},G_{in},B_{in})+(1-Ratio) \times LUT(R_{in},G_{in},B_{in})$$

In step s26, set the first output gray value Output1 (R, G, B) corresponding to the first pixel by using the addition result (255, 205, 226) of the input gray value ($R_{in}$, $G_{in}$, $B_{in}$) and the first corresponding value LUT1 ($R_{in}$, $G_{in}$, $B_{in}$), and set the second output gray value Output2 (R, G, B) corresponding to the second pixel by using the addition result (255, 234, 190) of the input gray value ($R_{in}$, $G_{in}$, $B_{in}$) and the second corresponding value LUT2 ($R_{in}$, $G_{in}$, $B_{in}$). In step s27, respectively drive the first pixel and the second pixel according to the first output gray value (255, 205, 226) and the second output gray value (255, 234, 190).

In this embodiment, when the first pixel and the second pixel are a pixel driven by an MSM form and a pixel driven by an SMS form in a same color-block image (or namely a same color image), an R output gray value of the first pixel is greater than an R output gray value of the second pixel, a G output gray value of the first pixel is less than a G output gray value of the second pixel, and a B output gray value of the first pixel is greater than a B output gray value of the second pixel. In an embodiment, a first output gray value of a first pixel may be substantially equal to a second output gray value of a second pixel.

When the saturation is within a second value range $N_1$ to $N_2$, a second conversion model corresponding to the saturation is about 0. The first output gray value Output1 (R, G, B) is substantially equal to the first corresponding value LUT1 ($R_{in}$, $G_{in}$, $B_{in}$), and the second output gray value Output2 (R, G, B) is substantially equal to the second corresponding value LUT2 ($R_{in}$, $G_{in}$, $B_{in}$). When the saturation of the input gray value is within a first value range, the greater the saturation is, the closer the first output gray value Output1 (R, G, B) is to the first corresponding value LUT1 ($R_{in}$, $G_{in}$, $B_{in}$), and the closer the second output gray value Output2 (R, G, B) is to the second corresponding value LUT2 ($R_{in}$, $G_{in}$, $B_{in}$), that is, the larger the difference between the first output gray value and the second output gray value is. When the saturation of the input gray value is within a third value range, the larger the saturation is, the closer the first output gray value Output1 (R, G, B) and the second output gray value Output2 (R, G, B) are to the input gray value ($R_{in}$, $G_{in}$, $B_{in}$), that is, the smaller the difference between the first output gray value and the second output gray value is. However, when the saturation of the input gray value is within the first value range or the third value range, the difference between the first output gray value and the second output gray value is still less than the difference between the first output gray value and the second output gray value when the saturation of the input gray value is within the second value range.

By means of the calculation of the first output gray value of the first pixel and the second gray value of the second pixel in this embodiment, not only the wide-view color washout phenomenon of the color-block image can be alleviated, but also the mesh problem of the color-block image can be alleviated. In the foregoing embodiment, the input gray value, the corresponding values, the output gray values, the parameter values of the conversion diagram, and thresholds of the value ranges are merely intended to facilitate the description, and can be designed by a person of ordinary skill in the art according to actual requirements, which is not limited in this embodiment.

Figure 6:
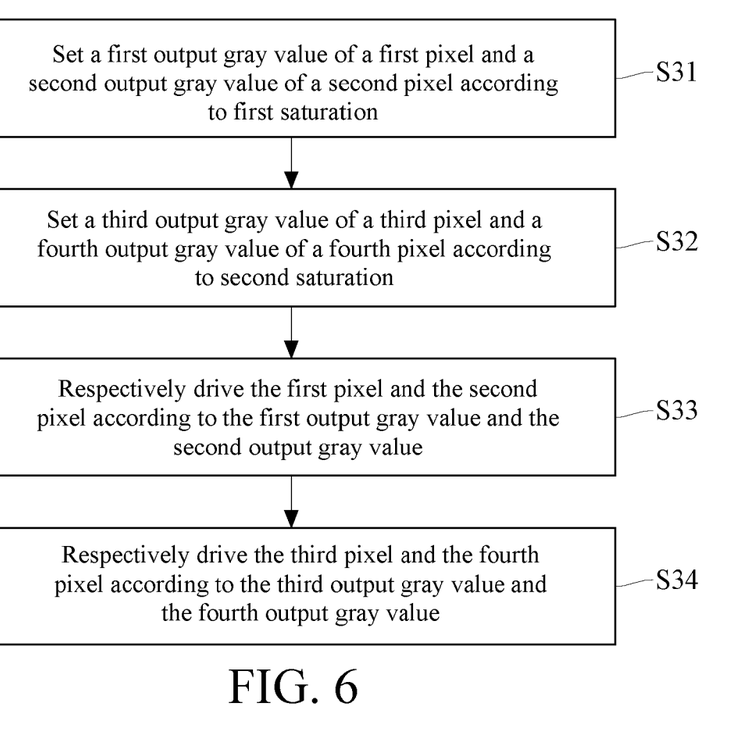
FIG. 6 is a step flowchart of a driving method for pixel according to still another embodiment of the present disclosure.

Further, driving methods for pixel of two different color-block images are described. Referring to FIG. 6, FIG. 6 is a step flowchart of a driving method for pixel according to still another embodiment of the present disclosure. As shown in FIG. 6, in step s31 of the driving method for pixel, set a first output gray value of a first pixel and a second output gray value of a second pixel according to first saturation; in step s32, set a third output gray value of a third pixel and a fourth output gray value of a fourth pixel according to second saturation; in step s33, respectively drive the first pixel and the second pixel according to the first output gray value and the second output gray value; and in step s34: respectively drive the third pixel and the fourth pixel according to the third output gray value and the fourth output gray value.

For example, the first pixel and the second pixel are two pixels for displaying a same first color-block image (or namely a same first color image), and the third pixel and the fourth pixel are two pixels for displaying a same second color-block image (or namely a same second color image). A first input gray value is a gray value of the first color-block image (or namely first color image), and a second input gray value is a gray value of the second color-block image (or namely second color image). At least one of an R input gray value, a G input gray value, and a B input gray value of the first input gray value is different from an R input gray value, a G input gray value, and a B input gray value of the second input gray value. In practice, the first saturation is decided according to the first input gray value of the first color-block image (or namely first color image), and the second saturation is decided according to the second input gray value of the second color-block image (or namely second color image). When a display receives input gray values of image data, the display converts the first input gray value into a first output gray value and a second output gray value, converts the second input gray value into a third output gray value and a fourth output gray value, and drives pixel structures corresponding to the first pixel to the fourth pixel according to the first output gray value to the fourth output gray value, so as to enable the first pixel to the fourth pixel to produce corresponding colors.

In this embodiment, when the first saturation is within a first value range or a third value range, the difference between the first output gray value and the second output gray value is less than the difference between the first output gray value and the second output gray value, when the first saturation is within a second value range. When the second saturation is within the first value range or the third value range, the difference between the third output gray value and the fourth output gray value is less than the difference between the third output gray value and the fourth output gray value, when the second saturation is within the second value range, where the second value range is between the first value range and the third value range. In other words, when the saturation of the input gray value is within a low saturation range or a high saturation range, the difference between colors displayed by pixels in a same color block (or namely a same color) is relatively small.

When the saturation of the input gray value is within a middle saturation range, the difference between colors displayed by pixels in a same color block (or namely a same color) is relatively large.

When the first saturation is within one of the first value range and the third value range, and the second saturation is within the second value range, the difference between the first output gray value and the second output gray value is less than the difference between the third output gray value and the fourth output gray value. In an embodiment, when first saturation and second saturation are within a first value range, and the first saturation is greater than the second saturation, the difference between a first output gray value and a second output gray value is greater than the difference between a third output gray value and a fourth output gray value. When the first saturation and the second saturation are within a third value range, and the first saturation is greater than the second saturation, the difference between the first output gray value and the second output gray value is less than the difference between the third output gray value and the fourth output gray value. When the first saturation and the second saturation are within a second value range, whether the difference between the first output gray value and the second output gray value is greater than or less than the difference between the third output gray value and the fourth output gray value is not limited.

In an embodiment, each of a first pixel to a fourth pixel has an R sub-pixel, a G sub-pixel, and a B sub-pixel, a first input gray value of one color-block image in image data also has an R input gray value, a G input gray value, and a B input gray value, and a second input gray value of another color-block image also has an R input gray value, a G input gray value, and a B input gray value. In this embodiment, in the driving method for pixel, the first saturation is calculated according to an R input gray value, a G input gray value, and a B input gray value of the first input gray value, and the second saturation is calculated according to an R input gray value, a G input gray value, and a B input gray value of the second input gray value. R output gray values, G output gray values, and B output gray values of the first pixel and the second pixel are separately set according to the first saturation, and R output gray values, G output gray values, and B output gray values of the third pixel and the fourth pixel are separately set according to the second saturation.

Each of the first output gray value, the second output gray value, the third output gray value, and the fourth output gray value includes an R output gray value, a G output gray value, and a B output gray value. The R output gray value, the G output gray value, and the B output gray value of the first output gray value are respectively used to drive an R sub-pixel, a G sub-pixel, and a B sub-pixel of the first pixel, the R output gray value, the G output gray value, and the B output gray value of the second output gray value are respectively used to drive an R sub-pixel, a G sub-pixel, and a B sub-pixel of the second pixel, the R output gray value, the G output gray value, and the B output gray value of the third output gray value are respectively used to drive an R sub-pixel, a G sub-pixel, and a B sub-pixel of the third pixel, and the R output gray value, the G output gray value, and the B output gray value of the fourth output gray value are respectively used to drive an R sub-pixel, a G sub-pixel, and a B sub-pixel of the fourth pixel.

In this embodiment, the first pixel and the second pixel are used to display the first color-block image (or namely first color image), the first pixel is a pixel driven by an MSM form (e.g. main, sub, main pixels are arranged in a predetermined direction) in the first color-block image (or namely first color image), and the second pixel is a pixel driven by an SMS form (e.g. sub, main, sub pixels are arranged in a predetermined direction) in the first color-block image (or namely first color image). The third pixel and the fourth pixel are used to display the second color-block image (or namely second color image), the third pixel is a pixel driven by an MSM form (e.g. main, sub, main pixels are arranged in a predetermined direction) in the second color-block image (or namely second color image), and the fourth pixel is a pixel driven by an SMS form (e.g. sub, main, sub pixels are arranged in a predetermined direction) in the second color-block image (or namely second color image). In this embodiment, the first pixel, the second pixel, the third pixel, and the fourth pixel are arranged as a same row, but the present disclosure is not limited thereto.

The MSM form and the SMS form are described with reference to the R sub-pixels, the G sub-pixels, and the B sub-pixels. The R sub-pixel of the first pixel is an M form (e.g. main pixel), the R sub-pixel of the second pixel is an S form (e.g. sub pixel), and at this time, an R output grey value of the first pixel is greater than or substantially equal to an R output gray value of the second pixel. Likewise, a G output grey value of the first pixel is less than or substantially equal to a G output gray value of the second pixel, a B output grey value of the first pixel is greater than or substantially equal to a B output gray value of the second pixel, an R output grey value of the third pixel is greater than or substantially equal to an R output gray value of the fourth pixel, a G output grey value of the third pixel is less than or substantially equal to a G output gray value of the fourth pixel, and a B output grey value of the third pixel is greater than or substantially equal to a B output gray value of the fourth pixel.

When the first saturation of the first input gray value is within the first value range or the third value range, the second saturation of the second input gray value is within the second value range, the difference between the first output gray value and the second output gray value is less than the difference between the third output gray value and the fourth output gray value. The difference between the first output gray value and the second output gray value is associated with at least one of the difference between the R output gray values of the first pixel and the second pixel, the difference between the G output gray values of the first pixel and the second pixel, and the difference between the B output gray values of the first pixel and the second pixel. The difference between the third output gray value and the fourth output gray value is associated with at least one of the difference between the R output gray values of the third pixel and the fourth pixel, the difference between the G output gray values of the third pixel and the fourth pixel, and the difference between the B output gray values of the third pixel and the fourth pixel.

In an embodiment, when first saturation of a first input gray value is within a first value range or a third value range, second saturation of a second input gray value is within a second value range, the difference between R output gray values of a first pixel and a second pixel is less than the difference between R output gray values of a third pixel and a fourth pixel, the difference between G output gray values of the first pixel and the second pixel is less than the difference between G output gray values of the third pixel and the fourth pixel, and the difference between B output gray values of the first pixel and the second pixel is less than the difference between B output gray values of the third pixel and the fourth pixel.

In other words, the difference between pixels separately driven by the MSM form (e.g. main, sub, main pixels are arranged in a predetermined direction) and the SMS form (e.g. sub, main, sub pixels are arranged in a predetermined direction) varies with different value ranges within which the saturation of the input gray value is. When the saturation of some color blocks (or namely some colors) in one image is within the second value range, the mesh phenomenon of the color-block image (or namely color image) is relatively obvious. However, when the saturation of some color blocks (or namely some colors) is within the first or the third value range, the mesh phenomenon of the color-block image (or namely color image) is relatively not obvious. Therefore, not only the wide-view color washout phenomenon of a display frame is alleviated, but also the mesh problem of the color-block image (or namely color image) is alleviated.

Figure 7:
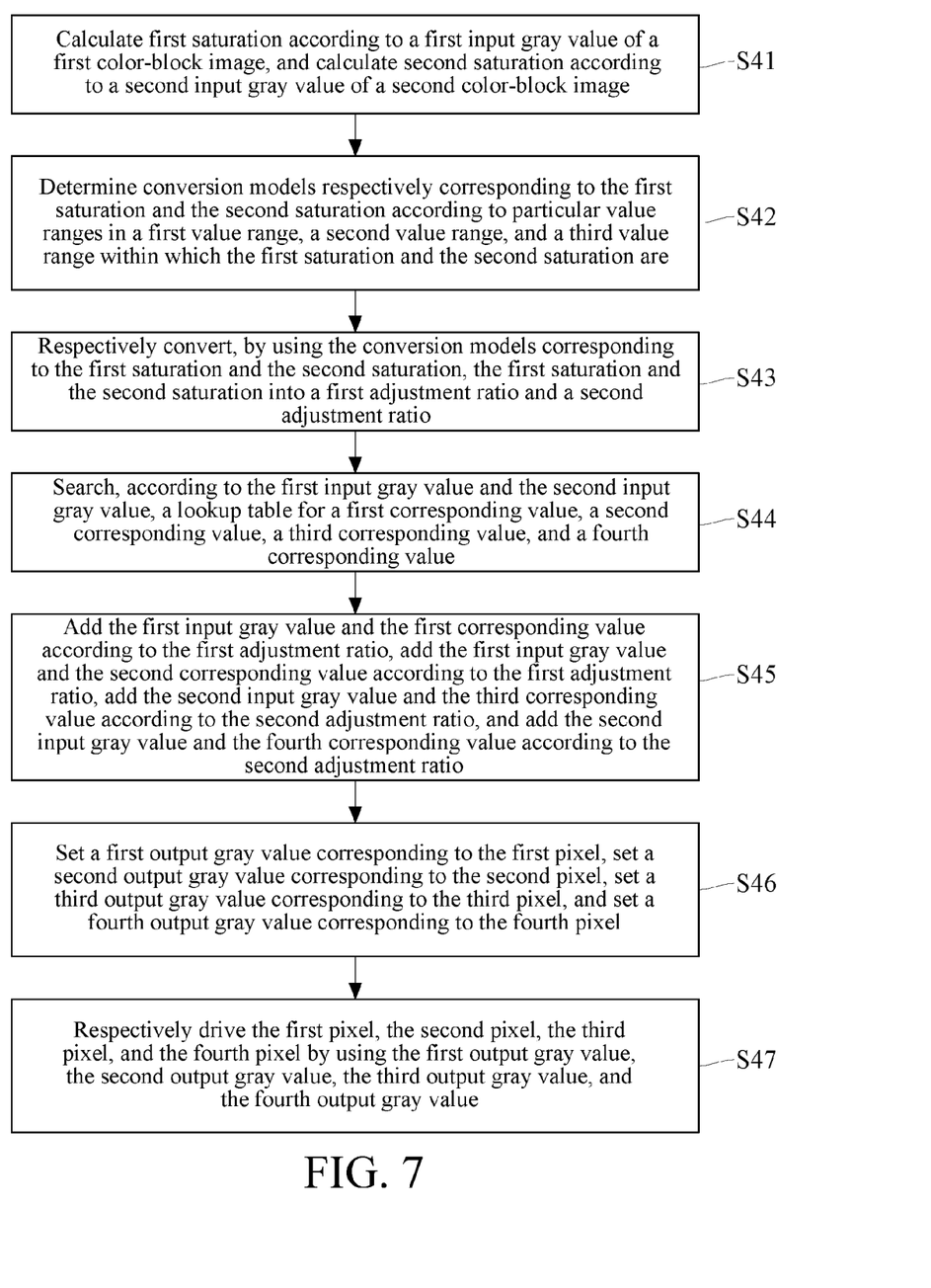
FIG. 7 is a step flowchart of a driving method for pixel according to yet another embodiment of the present disclosure.

Further, referring to FIG. 7 together, FIG. 7 is a step flowchart of a driving method for pixel according to yet another embodiment of the present disclosure. As shown in FIG. 7, the driving method for pixel in this embodiment is adapted to a display. When a first pixel and a second pixel of the display are used to display a first color-block image (or namely first color image), and a third pixel and a fourth pixel are used to display a second color-block image (or namely second color image), the display calculates, according to a first input gray value of the first color-block image (or namely first color image), a first output gray value and a second output gray value for driving the first pixel and the second pixel. The display calculates, according to a second input gray value of the second color-block image (or namely second color image), a third output gray value and a fourth output gray value for driving the third pixel and the fourth pixel.

Using each of the first pixel to the fourth pixel having an R sub-pixel, a G sub-pixel, and a B sub-pixel as an example, in step s41, the display calculates first saturation according to the first input gray value of the first color-block image (or namely first color image), and calculates second saturation according to the second input gray value of the second color-block image (or namely second color image). For example, the first input gray value of the first color-block image (or namely first color image) is $(R_{in}, G_{in}, B_{in})=(255, 220, 0)$, where 255 is an R input gray value of the first input gray value, 220 is a G input gray value of the first input gray value, and 0 is a B input gray value of the first input gray value. For example, the second input gray value of the second color-block image (or namely second color image) is $(R_{in}, G_{in}, B_{in})=(250, 125, 95)$. The display calculates, according to the following calculation formula, that the first saturation S1 of the first input gray value is about 1, and the second saturation S2 of the second input gray value is about 0.62.

$$S = \frac{\text{Max}(R_{in}, G_{in}, B_{in}) - \text{min}(R_{in}, G_{in}, B_{in})}{\text{Max}(R_{in}, G_{in}, B_{in})}$$

In step s42, the display determines conversion models respectively corresponding to the first saturation S1 and the second saturation S2 according to particular value ranges in a first value range, a second value range, and a third value range within which the first saturation S1 and the second saturation S2 are. For example, the conversion models are a conversion diagram of FIG. 7 or the following calculation formula, where $L_1$ and $L_2$ are separately about 1, $L_3$ and $L_4$ are separately about 0, $N_1$ is about 0.3, and $N_2$ is about 0.7. In step s43, the display respectively converts, by using the conversion models corresponding to the first saturation S1 and the second saturation S2, the first saturation S1 and the second saturation S2 into a first adjustment ratio Ratio1 and a second adjustment ratio Ratio2. In an embodiment, a first adjustment ratio Ratio1 is a ratio of the difference between a first output gray value and a first corresponding value to the difference between a first input gray value and the first corresponding value, a second adjustment ratio Ratio2 is a ratio of the difference between a third output gray value and a third corresponding value to the difference between a second input gray value and the third corresponding value. For example, the first saturation S1 of the first input gray value $(R_{in1}, G_{in1}, B_{in1})$, which is (255, 220, 0), is about 1, and is within the third value range, and therefore, the first saturation about 1 is converted, according to the conversion model, into the first adjustment ratio Ratio1, which is about 1. For example, the second saturation S2 of the second input gray value $(R_{in2}, G_{in2}, B_{in2})$, which is (255,125,95), is about 0.62, and is within the second value range, and therefore, the second saturation about 0.62 is converted, according to the conversion model, into the second adjustment ratio Ratio2, which is about 0.

$$\text{Ratio} = \frac{S \times (L_3 - L_1)}{N_1} + L_1, 0 \le S \le N_1$$

$$\text{Ratio} = \frac{(S - N_1) \times (L_4 - L_3)}{N_2 - N_1} + L_3, N_1 \le S \le N_2$$

$$\text{Ratio} = \frac{(S - N_2) \times (L_2 - L_4)}{1 - N_2} + L_4, N_2 \le S \le 1$$

In step s44, the display searches, according to the first input gray value and the second input gray value, a lookup table for a first corresponding value corresponding to the first pixel and a second corresponding value corresponding to the second pixel, and for a third corresponding value corresponding to the third pixel and a fourth corresponding value corresponding to the fourth pixel. The lookup table shows an MSM form (e.g. main, sub, main pixels are arranged in a predetermined direction) corresponding value and an SMS form (e.g. sub, main, sub pixels are arranged in a predetermined direction) corresponding value that correspond to each input gray value. In this embodiment, for example, the first corresponding value is (255, 194, 0), the second corresponding value is (255, 244, 0), the third corresponding value is (254, 51, 131), and the fourth corresponding value is (246, 168, 16).

In step s45, the display adds the first input gray value ($R_{in1}$, $G_{in1}$, $B_{in1}$) and the first corresponding value LUT1 ($R_{in1}$, $G_{in1}$, $B_{in1}$) according to the following calculation formula and the first adjustment ratio Ratio1, that is, $(1\times(255, 220, 0))+(0\times(255, 194, 0))=(255, 220, 0)$, adds the first input gray value ($R_{in1}$, $G_{in1}$, $B_{in1}$) and the second corresponding value LUT2 ($R_{in1}$, $G_{in1}$, $B_{in1}$) according to the following calculation formula and the first adjustment ratio Ratio1, that is, $(1\times(255, 220, 0))+(0\times(255, 244, 0))=(255, 220, 0)$, adds the second input gray value ($R_{in2}$, $G_{in2}$, $B_{in2}$) and the third corresponding value LUT3 ($R_{in2}$, $G_{in2}$, $B_{in2}$) according to the following calculation formula and the second adjustment ratio Ratio2, that is, $(0\times(255, 125, 95)+(1\times(254, 51, 131)=(254, 51, 131)$, and adds the second input gray value ($R_{in2}$, $G_{in2}$, $B_{in2}$) and the fourth corresponding value LUT4 ($R_{in1}$, $G_{in2}$, $B_{in2}$) according to the following calculation formula and the second adjustment ratio Ratio2, that is, $(0\times(255, 125, 95)+(1\times(246, 168, 16)=(246, 168, 16)$. Output(R, G, B)=Ratio$\times$($R_{in}$,$G_{in}$,$B_{in}$)+(1−Ratio)$\times$LUT($R_{in}$, $G_{in}$,$B_{in}$)

In step s46, set the first output gray value Output1 (R, G, B) corresponding to the first pixel by using the addition result (255, 220, 0) of the first input gray value ($R_{in1}$, $G_{in1}$, $B_{in1}$) and the first corresponding value LUT1 ($R_{in1}$, $G_{in1}$, $B_{in1}$), set the second output gray value Output2 (R, G, B) corresponding to the second pixel by using the addition result (255, 220, 0) of the first input gray value ($R_{in1}$, $G_{in1}$, $B_{in1}$) and the second corresponding value LUT2 ($R_{in1}$, $G_{in1}$, $B_{in1}$), set the third output gray value Output3 (R, G, B) corresponding to the third pixel by using the addition result (254, 51, 131) of the second input gray value ($R_{in2}$, $G_{in2}$, $B_{in2}$) and the third corresponding value LUT3 ($R_{in2}$, $G_{in2}$, $B_{in2}$), and set the fourth output gray value Output4 (R, G, B) corresponding to the fourth pixel by using the addition result (246, 168, 16) of the second input gray value ($R_{in2}$, $G_{in2}$, $B_{in2}$) and the fourth corresponding value LUT4 ($R_{in2}$, $G_{in2}$, $B_{in2}$). For example, the first input gray value of the first color-block image is (255, 220, 0), and the saturation is about 1. Therefore, by means of the design of the calculation formulas of the present disclosure, the corresponding output gray values may be the same as the input gray value, that is, when the saturation is about 1, the corresponding pixels driven by the MSM form and the SMS form receive the output gray values the same as the input gray value. Likewise, when the saturation corresponding to the input color-block image (or namely input color image) is about 0, the corresponding pixels driven by the MSM form and the SMS form receive the output gray values the same as the input gray value.

In step s47, respectively drive the first pixel, the second pixel, the third pixel, and the fourth pixel by using the first output gray value (255, 220, 0), the second output gray value (255, 220, 0), the third output gray value (254, 51, 131), and the fourth output gray value (246, 168, 16). In this embodiment, the input gray values, the corresponding values, the output gray values, the parameter values of the conversion diagram, and thresholds of the value ranges are merely intended to facilitate the description, and can be designed by a person of ordinary skill in the art according to actual requirements, which is not limited in this embodiment.

In this embodiment, when the first pixel and the second pixel are a pixel driven by an MSM form (e.g. main, sub, main pixels are arranged in a predetermined direction) and a pixel driven by an SMS form (e.g. sub, main, sub pixels are arranged in a predetermined direction) in a same color-block image (or namely color image), an R output gray value of the first pixel is greater than or substantially equal to an R output gray value of the second pixel, a G output gray value of the first pixel is less than or substantially equal to a G output gray value of the second pixel, and a B output gray value of the first pixel is greater than or substantially equal to a B output gray value of the second pixel. Likewise, when the third pixel and the fourth pixel are a pixel driven by an MSM form and a pixel driven by an SMS form in a same color-block image, an R output gray value of the third pixel is greater than or substantially equal to an R output gray value of the fourth pixel, a G output gray value of the third pixel is less than or substantially equal to a G output gray value of the fourth pixel, and a B output gray value of the third pixel is greater than or substantially equal to a B output gray value of the fourth pixel.

When the first saturation or the second saturation is within the second value range $N_1$ to $N_2$, the second conversion model corresponding to the first saturation or the second saturation is 0. At this time, the first output gray value Output1 (R, G, B) is substantially equal to the first corresponding value LUT1 ($R_{in1}$, $G_{in1}$, $B_{in1}$), the second output gray value Output2 (R, G, B) is substantially equal to the second corresponding value LUT2 ($R_{in1}$, $B_{in1}$), the third output gray value Output3 (R, G, B) is substantially equal to the third corresponding value LUT3 ($R_{in2}$, $G_{in2}$, $B_{in2}$), the fourth output gray value Output4 (R, G, B) is substantially equal to the fourth corresponding value LUT4 ($R_{in2}$, $G_{in2}$, $B_{in2}$).

When the first saturation is within the first value range, the greater the first saturation is, the closer the first output gray value is to the first corresponding value, the closer the second output gray value is to the second corresponding value, and the larger the difference between the first output gray value and the second output gray value is. When the first saturation of the first input gray value is within the third value range, the larger the first saturation is, the closer the first output gray value or the second output gray value is to the first input gray value, and the smaller the difference between the first output gray value and the second output gray value is. Likewise, when the second saturation is within the first value range, the greater the second saturation is, the closer the third output gray value is to the third corresponding value, the closer the fourth output gray value is to the fourth corresponding value, and the larger the difference between the third output gray value and the fourth output gray value is. When the second saturation of the second input gray value is within the third value range, the larger the second saturation is, the closer the third output gray value or the fourth output gray value is to the second input gray value, and the smaller the difference between the third output gray value and the fourth output gray value is.

However, when the first saturation of the first input gray value is within the first value range or the third value range, the difference between the first output gray value and the second output gray value is still less than the difference between the first output gray value and the second output gray value when the first saturation of the first input gray value is within the second value range. When the second saturation of the second input gray value is within the first value range or the third value range, the difference between the third output gray value and the fourth output gray value is still less than the difference between the third output gray value and the fourth output gray value when the second saturation of the second input gray value is within the second value range.

To sum up, the embodiments of the present disclosure provide a driving method for pixel. The human eye is not sensitive to color washout phenomena of colors with high saturation and low saturation, and therefore, the difference between pixels of a color-block image (or namely color image) with high saturation and the difference between pixels of a color-block image (or namely color image) with low saturation are made less than the difference between pixels of a color-block image (or namely color image) with middle saturation, such that an image displayed on a screen still has an advantage of reducing wide-view color washout, and a visual mesh problem of a uniform color-block image (or namely substantially uniform color image) is further reduced.

Although the present disclosure is described above by means of the embodiments, the above description is not intended to limit the present disclosure. Variations and modifications made without departing from the spirit and scope of the present disclosure all fall within the scope of the present disclosure. Refer to the appended claims for the protection scope defined by the present disclosure.

What is claimed is:

1. A driving method, for driving a first pixel and a second pixel, comprising:
    setting a first output gray value of the first pixel and a second output gray value of the second pixel according to saturation, wherein the saturation is according to an input gray value; and
    driving the first pixel and the second pixel according to the first output gray value and the second output gray value respectively;
    wherein a first difference is between the first output gray value and the second output gray value when the saturation is within a first value range or a third value range, a second difference is between the first output gray value and the second output gray value when the saturation is within a second value range, the second value range is between the first value range and the third value range, and the first difference is less than the second difference.

2. The driving method for pixel according to claim 1, wherein each of the first pixel and the second pixel comprises a first color pixel, a second color pixel, and a third color pixel;
    wherein each of the first output gray value and the second output gray value comprises a first color output gray value, a second color output gray value, and a third color output gray value, respectively used to drive the first color pixel, the second color pixel, and the third color pixel; and
    wherein the first difference and the second difference are associated with at least one of color differences between two first color gray values, two second color gray values, and two third color gray values of the first output gray value and the second output gray value.

3. The driving method for pixel according to claim 2, wherein the first color output gray value of the first output gray value is greater than or substantially equal to the first color output gray value of the second output gray value, the second color output gray value of the first output gray value is less than or substantially equal to the second color output gray value of the second output gray value, and the third color output gray value of the first output gray value is greater than or substantially equal to the third color output gray value of the second output gray value.

4. The driving method for pixel according to claim 1, wherein the step of setting a first output gray value of the first pixel and a second output gray value of the second pixel according to saturation further comprises:
    determining a conversion model corresponding to the first value range, the second value range, or the third value range which the saturation is within;
    converting the saturation into an adjustment ratio by using the conversion model;
    searching, according to the input gray value, a lookup table for a first corresponding value corresponding to the first pixel and a second corresponding value corresponding to the second pixel;
    setting the first output gray value by combining the input gray value and the first corresponding value according to the adjustment ratio, and setting the second output gray value by combining the input gray value and the second corresponding value according to the adjustment ratio.

5. The driving method for pixel according to claim 4, wherein when the saturation is within the second value range, setting the first output gray value corresponding to the first pixel by using the first corresponding value, and setting the second output gray value corresponding to the second pixel by using the second corresponding value.

6. The driving method for pixel according to claim 4, wherein the first value range is lower than the third value range;
    wherein when the saturation is within the first value range, the saturation increases as the first output gray value is closer to the first corresponding value, and the second output gray value is closer to the second corresponding value; and
    wherein when the saturation is within the third value range, the saturation is decreases as the first output gray value and the second output gray value are closer to the input gray value.

7. The driving method for pixel according to claim 4, wherein when the saturation is within the first value range, the conversion model corresponding is defined as a decreasing curve that the adjustment ratio decreases as the saturation increases, and when the saturation is within the third value range, the conversion model corresponding to the saturation is defined as an increasing curve that the adjustment ratio increases as the saturation increases.

8. The driving method for pixel according to claim 4, wherein the adjustment ratio is a ratio of difference between the first output gray value and the first corresponding value to difference between the input gray value and the first corresponding value.

9. A driving method for driving a first pixel, a second pixel, a third pixel, and a fourth pixel, comprising:
    setting a first output gray value of the first pixel and a second output gray value of the second pixel according to first saturation, wherein the first saturation is according to a first input gray value;
    setting a third output gray value of the third pixel and a fourth output gray value of the fourth pixel according to second saturation, wherein the second saturation is according to a second input gray value;
    driving the first pixel and the second pixel according to the first output gray value and the second output gray value respectively; and
    driving the third pixel and the fourth pixel according to the third output gray value and the fourth gray value respectively;
    wherein when the first saturation is within one of a first value range and a third value range, and the second saturation is within a second value range, the difference between the first output gray value and the second output gray value is less than the difference between the third output gray value and the fourth output gray value, and the second value range is between the first value range and the third value range.

10. The driving method for pixel according to claim 9, wherein each of the first input gray value and the second input gray value comprises a first color input gray value, a second color input gray value, and a third color input gray value, and at least one of the first color input gray value, the second color input gray value, and the third color input gray value of the first input gray value is different from the first color input gray value, the second color input gray value, and the third color input gray value of the second input gray value.

* * * * *

UNITED STATES PATENT AND TRADEMARK OFFICE
CERTIFICATE OF CORRECTION

PATENT NO. : 10,078,250 B2
APPLICATION NO. : 15/637084
DATED : September 18, 2018
INVENTOR(S) : Ruan et al.

Page 1 of 1

It is certified that error appears in the above-identified patent and that said Letters Patent is hereby corrected as shown below:

On the Title Page (73) Assignee, please insert:
--AU OPTRONICS CORPORATION, Hsin-Chu (TW)--

Signed and Sealed this
Thirtieth Day of April, 2019

Andrei Iancu
*Director of the United States Patent and Trademark Office*